(12) United States Patent
Smith (10) Patent No.: US 9,544,652 B1
(45) Date of Patent: Jan. 10, 2017

(54) SYSTEMS AND METHODS FOR PROVIDING SELF-SERVICES OVER TELEVISION

(71) Applicant: UNITED SERVICES AUTOMOBILE ASSOCIATION (USAA), San Antonio, TX (US)

(72) Inventor: Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/665,378

(22) Filed: Mar. 23, 2015

Related U.S. Application Data (63) Continuation of application No. 13/741,170, filed on Jan. 14, 2013, now Pat. No. 8,990,862, which is a continuation of application No. 11/845,517, filed on Aug. 27, 2007, now Pat. No. 8,370,876.

(51) Int. Cl.
| | |
|---|---|
| H04N 5/445 | (2011.01) |
| H04N 21/478 | (2011.01) |
| H04N 21/235 | (2011.01) |
| H04N 21/41 | (2011.01) |
| H04N 21/472 | (2011.01) |
| H04N 21/239 | (2011.01) |
| H04N 21/2668 | (2011.01) |
| H04N 21/458 | (2011.01) |

(52) U.S. Cl.
CPC .... *H04N 21/47805* (2013.01); *H04N 21/2351* (2013.01); *H04N 21/2393* (2013.01); *H04N 21/2668* (2013.01); *H04N 21/4126* (2013.01); *H04N 21/458* (2013.01); *H04N 21/47214* (2013.01)

(58) Field of Classification Search
CPC .......................... H04N 21/2668; H04N 21/458
USPC ...................................................... 725/58, 60
See application file for complete search history.

(56) References Cited

U.S. PATENT DOCUMENTS

| | | |
|---|---|---|
| 5,987,611 A | 11/1999 | Freund |
| 6,681,396 B1 | 1/2004 | Bates et al. |
| 6,816,724 B1 | 11/2004 | Asikainen |

(Continued)

OTHER PUBLICATIONS

"Interactive TV Today [itvt]", American Film Institute/Intel Corporation/Trace Swedlow, http://www.itvt.com/etvwhitepaper-3.html, Copyright 2000, 4 pages.

(Continued)

*Primary Examiner* — Pankaj Kumar
*Assistant Examiner* — Franklin Andramuno
(74) *Attorney, Agent, or Firm* — Fletcher Yoder, P.C.

(57) ABSTRACT

Cable and satellite television systems, televisions, and universal remotes are used to provide interactive financial self-services to users. The cable or satellite system provides a connection between a user and a financial services company. A television or other display device connects to the cable or satellite system and displays content from the financial services company to a user. The user may enter data and navigate through the content via a back channel using a universal remote or other input device. The user may thus complete the content, such as completing a loan application, opening a bank account, or purchasing insurance. The user may provide authentication information to receive personalized content.

17 Claims, 6 Drawing Sheets

(56) References Cited

U.S. PATENT DOCUMENTS

| | | | |
|---|---|---|---|
| 7,181,417 B1* | 2/2007 | Langseth | G06Q 30/0621 |
| | | | 705/26.5 |
| 8,370,876 B1 | 2/2013 | Smith | |
| 8,990,862 B1 | 3/2015 | Smith | |
| 2001/0053277 A1* | 12/2001 | Jun | G06F 17/30017 |
| | | | 386/350 |
| 2001/0056401 A1* | 12/2001 | Tompkins | G06Q 20/02 |
| | | | 705/42 |
| 2008/0282294 A1 | 11/2008 | Carpenter et al. | |

OTHER PUBLICATIONS

Wallace, "Interactive TV Creeps Back Into the Vocabulary", http://www.xchangemag.com/, Apr. 30, 2007, Copyright by Virgo Publishing, 5 pages.

Full Service Network, "Full Service Network FSN) in Orlando, Florida", http://www.ust.hk/~webiway/content/USA/trail/fsn.html, 2 pages.

ROK Connect Limited, "TV Banking, Internet Banking & PC Banking", http://www.bizhelp24.com/, Copyright by ROK Connect Limited, 2007, 4 pages.

U.S. Appl. No. 11/845,517, filed Aug. 27, 2007 by Arthur Quentin Smith, now allowed.

Non-Final Office Action for U.S. Appl. No. 11/845,517 mailed on Mar. 11, 2010, 9 pages.

Non-Final Office Action for U.S. Appl. No. 11/845,517 mailed on Oct. 4, 2011, 7 pages.

Notice of Allowance for U.S. Appl. No. 11/845,517 mailed on Oct. 2, 2012, 5 pages.

* cited by examiner

SYSTEMS AND METHODS FOR PROVIDING SELF-SERVICES OVER TELEVISION

CROSS-REFERENCE TO RELATED APPLICATIONS

This application is a continuation of U.S. patent application Ser. No. 13/741,170, filed on Jan. 14, 2013, now U.S. Pat. No. 8,990,862, which is a continuation of U.S. patent application Ser. No. 11/845,517, filed on 5 Aug. 27, 2007, now U.S. Pat. No. 8,370,876, the disclosures of which are hereby incorporated by reference in their entirety. This application is also related by subject matter to that disclosed in the following commonly assigned applications, now abandoned, the entirety of which are hereby incorporated by reference herein: U.S. patent application Ser. No. 11/845,522, U.S. patent application Ser. No. 11/845,529, and U.S. patent application Ser. No. 11/845,541, each filed on Aug. 27, 2007 and entitled "Systems And Methods For Providing Self-Services Over Television."

BACKGROUND

Currently, financial services companies provide users with self-service access to financial services via telephone, the Internet, and/or in person at the company. However, some users do not have Internet access, and some users are not able to travel to the financial services company in person. Additionally, some financial services cannot be properly provided, described, or completed by a user over the telephone.

SUMMARY

Cable and satellite television systems, televisions, and universal remotes are used to provide interactive financial self-services to users. The cable or satellite system provides a connection between a user and a financial services company. A television or other display device connects to the cable or satellite system, and displays content from the financial services company to a user. The user may enter data and navigate the content using a universal remote or other input device, via a back channel. The user may thus complete the content, such as completing a loan application, opening a bank account, or purchasing insurance. The user may provide authentication information to receive personalized content.

Instead of providing data through a universal remote or other input device, the user may speak with a service representative on a telephone while the content is being televised. The representative may authenticate the user and, based on the discussion with the user, enter data that is then displayed as content. The representative may provide other assistance to the user via the telephone.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustration, there is shown in the drawings example constructions of the embodiments; however, the embodiments are not limited to the specific methods and instrumentalities disclosed. In the drawings.

DETAILED DESCRIPTION

Figure 1:
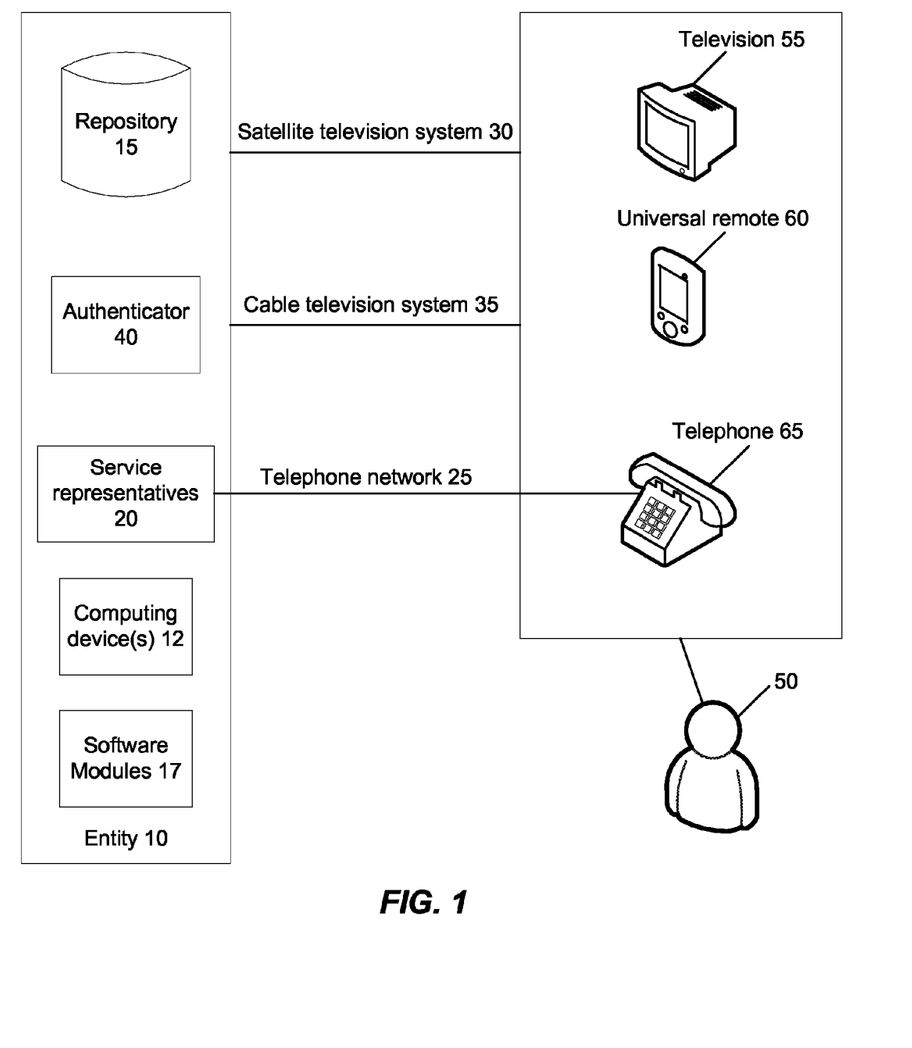
FIG. 1 is a diagram of an implementation of a system for providing financial services over a television.

FIG. 1 is a diagram of an implementation of a system for providing financial services over a television. An entity 10, such as a financial services company, maintains a repository 15 of content in areas of insurance, trading, and banking, for example, comprising financial forms, documents, applications, products, services, etc. directed to loan application processing, loan closings, insurance applications, proof of insurance, claims status, money movement between accounts, trading, annuity or whole life values and payouts, etc., for example.

Content in the repository 15 may be transmitted via a satellite television system 30 or a cable television system 35, for example, to a television 55, associated with a user 50. In this manner, the user 50 may view and interact with the content on the television 55. Satellite television and cable television systems are well known and their descriptions are omitted for brevity. In an implementation, the television 55 may be any device that may receive a television transmission by waves or by a network.

Because the content is provided over a satellite television system 30 or a cable television system 35, for example, interactive television may be used. The content and related software may be stored and/or executed locally on a set-top box or other appropriate device associated with the television 55. This allows a user 50 to directly interact with the content displayed on the television 55 via a universal remote 60 or other input device, for example. In an implementation, a return path (also referred to herein as a back channel) from the television 55 to the entity 10 is provided. This return path can be by telephone, mobile SMS (text messages), radio, digital subscriber lines (ADSL), or cable, for example. An authenticator 40 may be used to authenticate the user via a login technique, e.g., involving a password, code, credential, key, etc. Set-top boxes, universal remotes, and authentication techniques are well known and their descriptions are omitted for brevity.

In an implementation, a telephone 65 may be associated with the user, and may be connected with the phone of a service representative 20 via any conventional telephone connection or telephone network 25. Thus, during the televising of content to a user, the user may speak with a service representative 20 on the telephone 65 about the content that is being provided to the television 55.

The entity 10 may use one or more computing devices 12 in providing financial services to a user via the television 55. An example computing device is described below with respect to FIG. 6. Referring to FIG. 1, software modules 17 are shown that may be used in the performance of the example techniques described herein in conjunction with the other various elements and components of the systems described herein. Example software modules include modules for generating and/or personalizing financial services content, retrieving content, and preparing content for televising, described further herein. While specific functionality is described herein as occurring with respect to specific modules, the functionality may likewise be performed by more, fewer, or other modules. The functionality may be distributed among more than one module.

Figure 2:
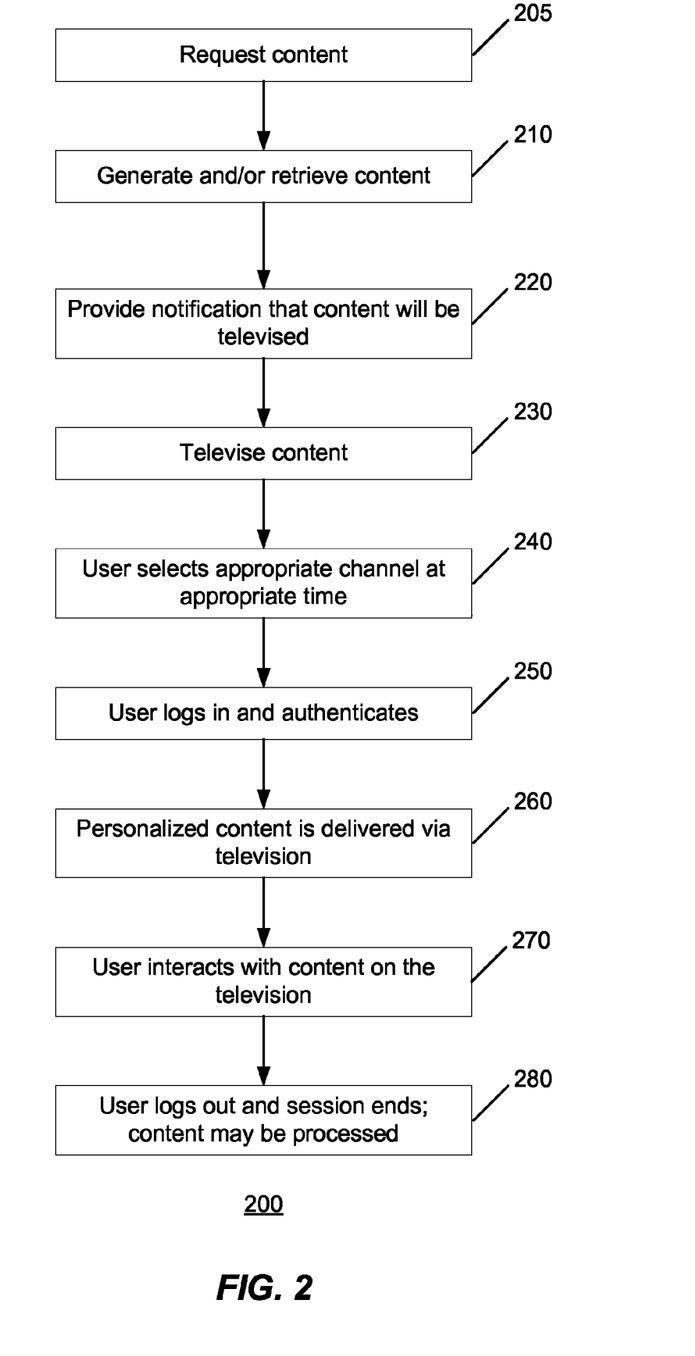
FIG. 2 is an operational flowchart of an implementation of a method for providing financial services over a television.

FIG. 2 is an operational flowchart of an implementation of a method 200 for providing financial services over a television. At operation 205, a user requests some content, such as a mortgage loan application, an auto loan application, or a savings account application, for example, from an entity such as a financial services company, bank, or other institution. The request may be made via a telephone call, facsimile, or letter, for example, to the entity. Alternately, the content may be requested, desired, or initiated by the entity or another entity, such as a third party entity.

At operation 210, the request is received, and the content is generated and/or retrieved from storage, such as a repository or other data storage device. For example, a loan application or other type of application or document may be retrieved from storage and pre-filled with personalized data pertaining to the user and the transaction (e.g., user name and address, loan amount, rate, term, etc.).

At operation 220, the user is notified that the personalized content will be televised. The notification may include the date and time that the requested content will be televised, along with the television channel on which it will be televised. The notification may take the form of a telephone call, facsimile, or letter, for example.

Alternatively, in an implementation, it is contemplated that the user may select the date and time that he would like the requested content to be televised. The user may provide this request to the entity via a telephone call, facsimile, or letter, for example. The user may then receive notification confirming the date and time that the personalized content will be televised, along with the television channel on which it will be televised. The notification may take the form of a telephone call, facsimile, or letter, for example.

At operation 230, the content is televised at the predetermined date and time, and on the predetermined channel. The user selects the proper channel on his television at the proper date and time and may be presented with a login screen, at operation 240. The user then logs in and authenticates himself, at operation 250, to the entity or an authentication authority, using any of the well known authentication techniques involving a predetermined code, key, password, etc. The data provided by the user for the authentication may be entered via the universal remote or other input device. In this manner, only an authorized user may access the personalized content that is being televised.

After a successful authentication, the personalized content is televised at operation 260 (any type of encryption and decryption of the televised content may be used), and the user may interact with it, e.g., by scrolling through pages, pausing and playing, entering data into fields, applying a signature, etc., by using the universal remote or other input device, at operation 270. As noted above, depending on the implementation, the back channel from the television to the entity, authentication authority, etc. may be by telephone, mobile SMS (text messages), radio, digital subscriber lines (ADSL), or cable, for example. Cable television viewers receive their television via a cable, and in some platforms, they may use the same cable as that used by a back channel. Satellite television viewers may return information to the broadcaster via their regular telephone lines, although other data communications technology may also be used.

After the user has completed his interaction with the content, he may log out, thereby ending the interactive television session, at operation 280. The content may then be stored and processed by the entity (e.g., a loan application may be processed, a bank account may be opened, etc.). The user therefore is able to view and complete the content, such as applying for a loan or opening a bank account, for example, without physically visiting the entity and without the user having to log on to a personal computer or the Internet, for example. Thus, paperless self-service is provided by the method 200.

In an implementation, the user and a service representative may confer via telephone about the content being televised, its instructions, and related information, for example. Either the user or the service representative may initiate the call.

Figure 3:
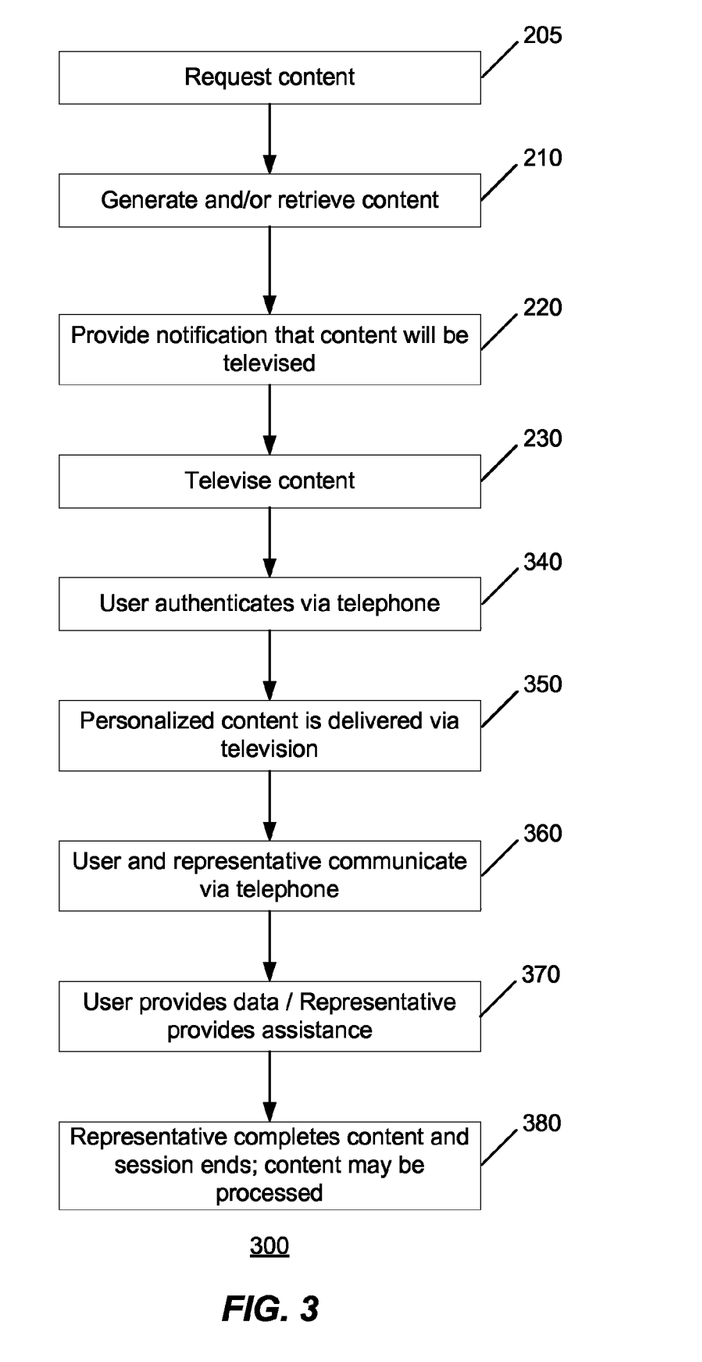
FIG. 3 is a operational flowchart of another implementation of a method for providing financial services over a television.

FIG. 3 is an operational flowchart of another implementation of a method 300 for providing financial services over a television. Here, the content may be personalized and delivered via television as in operations 205-230 of the implementation of the method 200 shown in FIG. 2. A telephone connection may act as the back channel between the entity and the user's television. After operation 230 in FIG. 3, at operation 340, the user authenticates himself over the telephone to a service representative or an authentication authority, for example. The user may provide a predetermined code, key, password, or other identifier(s), via the telephone for authentication.

After a successful authentication, the personalized content is televised at operation 350, with any appropriate type of encryption and decryption of the televised content being used. While the content is being televised, the user and the service representative may be in communication via the telephone, at operation 360. The representative may provide assistance or other information to the user about the televised content, and the user may in turn provide authorization or other information to the representative about the televised content, at operation 370. The representative may enter this information and authorization into the content to complete it, at operation 380, and the session ends. The content may then be processed and/or stored, for example. The content may therefore be completed with a user using the telephone and the television, without a personal visit to the entity and without the use of a personal computer or the Internet, for example.

Figure 4:
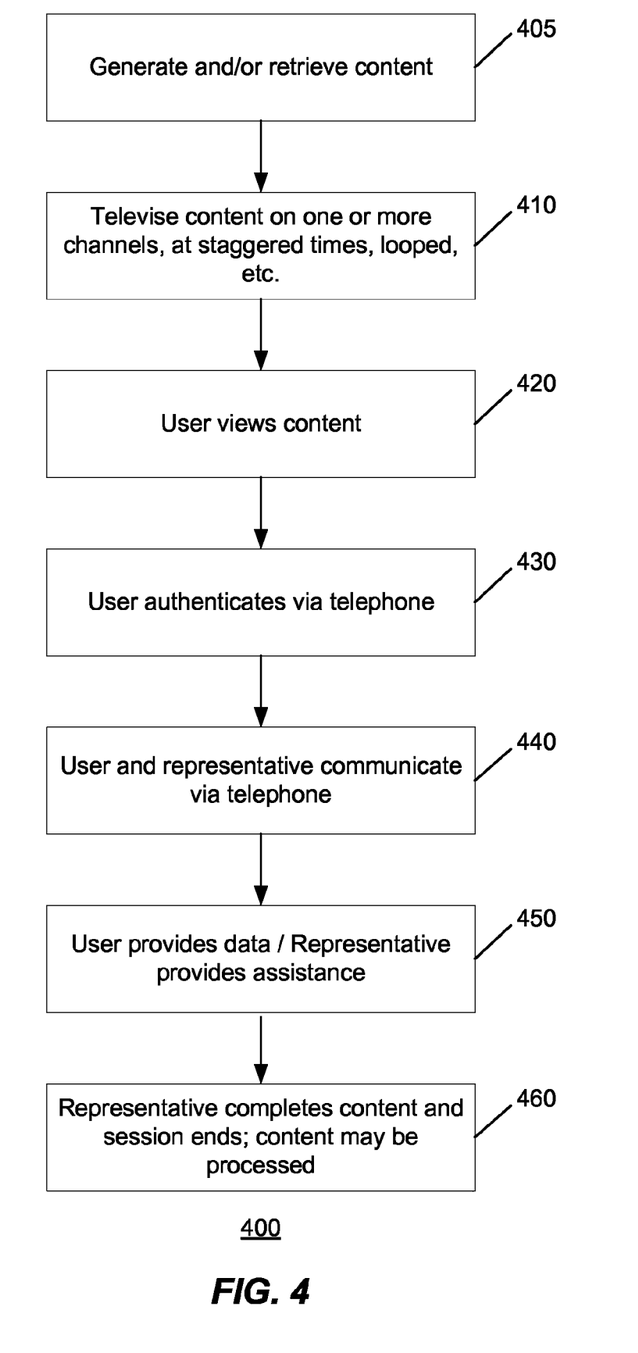
FIG. 4 is an operational flowchart of another implementation of a method for providing financial services over a television.

FIG. 4 is an operational flowchart of another implementation of a method 400 for providing financial services over a television. Here, the content that is initially delivered via television is not personalized to a particular user; instead, it is standardized so as to be relevant to many users such as a group or population of users. The content may be information pertaining to a loan application, an account application, or other financial services, for example. The user may speak with a representative while the content is televised and have the representative prepare personalized content for him based on the standardized delivered content, such as completing a loan application or opening an account, for example.

The content may be televised on a particular channel at a particular time or times, on a set of channels at staggered times, or on a looped transmission shown repetitively throughout the day, so that a user may select a channel to view the content at a time that is convenient to the user. Due to the various televising times on the various channels, the user will not have to wait to view a particular portion of the content.

At operation 405, the content is generated and/or retrieved from storage. For example, a loan application or an account application may be retrieved from storage. At operation 410, the content is televised on a particular channel or set of channels, at various predetermined times. The user selects the proper channel on his television and may view the content, at operation 420.

As in the implementation of the method 300 shown in FIG. 3, a telephone connection between the user and a service representative may act as the back channel between the entity and the user's television. At operation 430, the user authenticates himself via telephone to a service representative or an authentication authority, for example, using a password or other identifier(s), for example.

While the content is being televised, the user and the service representative may be in communication via the telephone, at operation 440. The representative may provide assistance or other information to the user about the content, and the user may in turn provide authorization or other information to the representative about the televised content, at operation 450. The representative may enter this information and authorization into the content to complete it, at operation 460, and the session ends. As with the implementation of the method 300 shown in FIG. 3, the content may thus be completed by a user using the telephone and the television without a personal visit to the entity and without the use of a personal computer or the Internet, for example.

Figure 5:
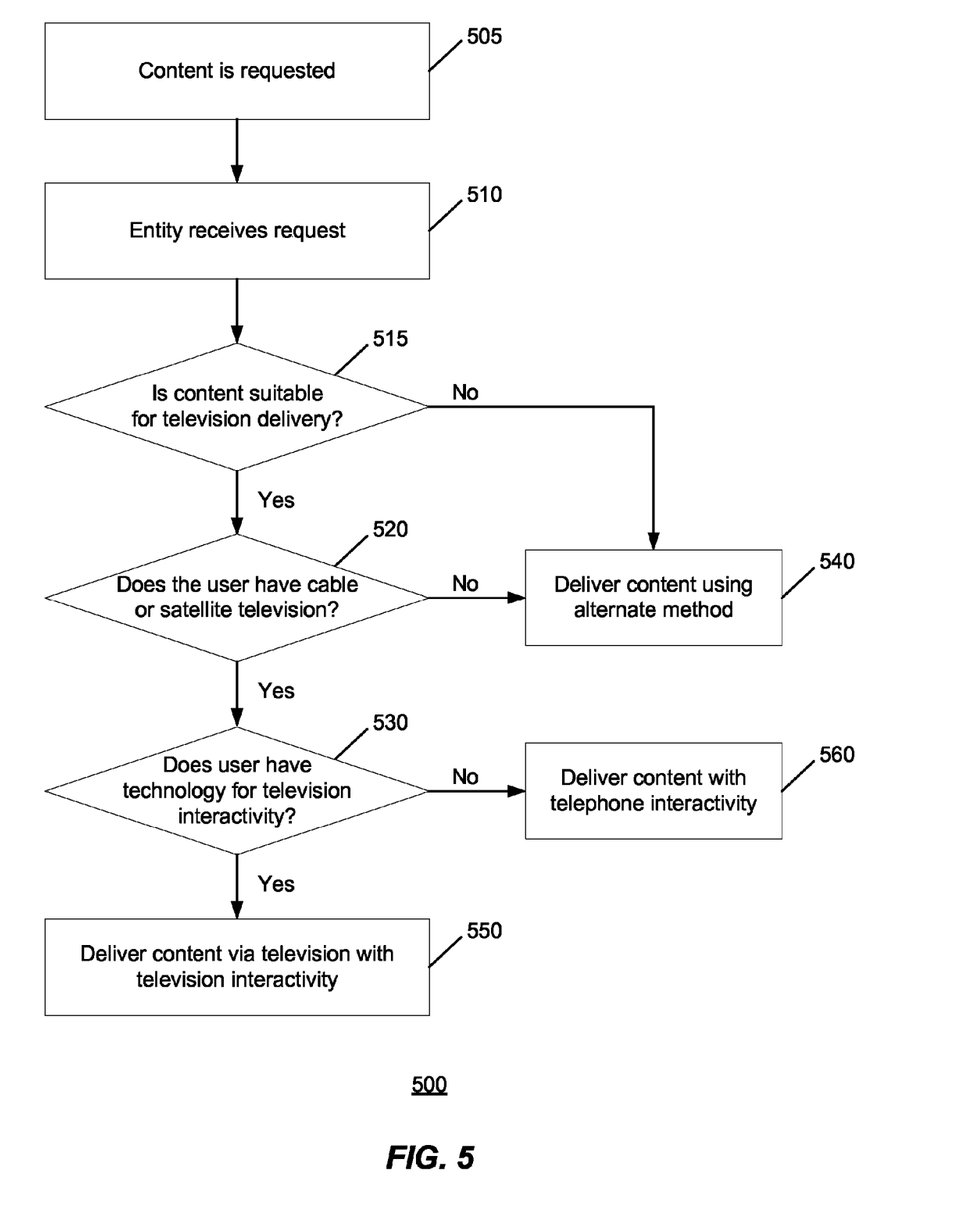
FIG. 5 is an operational flowchart of another implementation of a method for providing financial services.

FIG. 5 is an operational flowchart of another implementation of a method 500 for providing financial services. The method of delivery of content from an entity, such as entity 10, to a user, such as user 50, with reference to FIG. 1, is determined based on aspects such as characteristics of the content that is requested by a user and the technologies employed by the user.

At operation 505, similar to operation 205, a user requests some content from an entity. At operation 510, the request is received, and the entity determines how to provide the content to the user and how to interact with the user. In an implementation, the entity determines, at operation 520, whether the user has a television on a cable television system or a satellite television system, and whether the television is equipped for interaction via a universal remote or other input device, at operation 530. If so, then the content may be prepared and delivered using the interactivity and features described with respect to the implementation of the method 200 shown in FIG. 2, at operation 550.

If the user does have a television on a cable television system or a satellite television system, but does not have the equipment for interaction via the television as determined at operation 530, then the content may be prepared and delivered over the television with the interactivity occurring over the telephone with a representative, as described with respect to the implementations of the method 300 shown in FIG. 3 or of the method 400 shown in FIG. 4, for example, at operation 560.

If it is determined at operation 520 that the user does not have a television on a cable television system or a satellite television system, then the user may not be equipped for interactive financial services over the television, and other methods may be used to deliver the content, such as via telephone, facsimile, or via letter or mail, for example, at operation 540.

Alternately or additionally, the entity may determine that the requested content is not suitable for interactive financial services over the television at operation 515, and instead may determine that another method should be used for content delivery, such as via telephone, facsimile, or via letter or mail, for example, at operation 540. Operation 515 may occur prior to determining whether the user has an appropriately equipped television or after. Content may not be suitable for interactive financial services over the television if it is too simple or too complex, too lengthy, has not yet been approved for television delivery by regulators, or the user has indicated he has broadband Internet access and can access the content using the Internet, for example.

Exemplary Computing Arrangement

Figure 6:
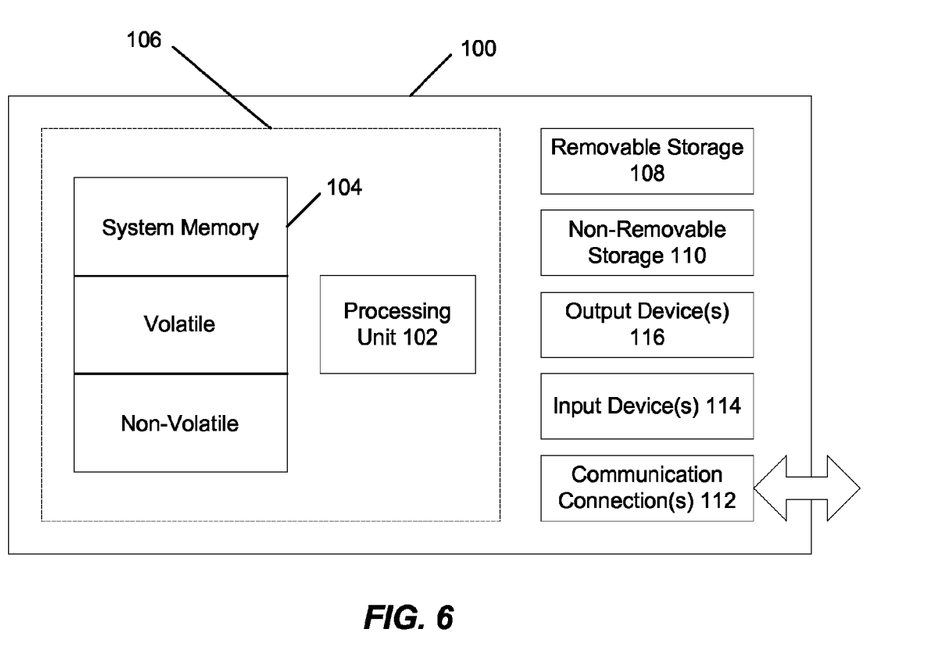
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules being executed by a computer may be used. Generally, program modules include routines, programs, objects, components, data structures, etc. that perform particular tasks or implement particular abstract data types. Distributed computing environments may be used where tasks are performed by remote-processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features/ functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. System memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communications connection(s) 112 that allow the device to communicate with other devices. Communications connection(s) 112 is an example of communication media. Communication media typically embody computer-readable instructions, data structures, program modules or other data in a modulated data signal such as a carrier wave or other transport mechanism and includes information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. The term "computer-readable media" as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application program interface (API), reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing televised financial services, comprising:
   receiving, using a processor, a request from a user for financial services content;
   generating, using the processor, financial services content personalized with user information;
   determining, using the processor, whether the financial services content is suitable for television delivery;
   determining, using the processor, whether a television associated with the user is capable of interacting with the processor; and
   televising, using the processor, the financial services content on a television channel of the television when the financial services content is suitable for television delivery and the television associated with the user is capable of interacting with the processor.

2. The method of claim 1, further comprising providing, using the processor, a notification including a predetermined time and a predetermined channel that the financial services content will be televised.

3. The method of claim 1, further comprising:
   receiving, using the processor, a selection of a predetermined time from the user to televise the financial services content; and
   providing, using the processor, a notification confirming that the personalized financial services content will be televised at the predetermined time.

4. The method of claim 1, further comprising:
   receiving, using the processor, user input pertaining to the financial services content; and
   incorporating, using the processor, the user input into the financial services content.

5. The method of claim 4, wherein the user input is received via telephone.

6. The method of claim 1, comprising determining, using the processor, that the user does not have Internet access and has a television technology for television interactivity prior to televising the financial services content on the television channel.

7. A non-transitory computer-readable storage medium comprising a plurality of computer-readable instructions tangibly embodied on the computer-readable storage medium, which, when executed by a data processor, televise financial services, the plurality of instructions comprising:
   instructions that cause the data processor to receive a request from a user for financial services content;

instructions that cause the data processor to generate financial services content personalized with user information;

instructions that cause the data processor to determine whether the financial services content is suitable for television delivery;

instructions that cause the data processor to determine whether a television associated with the user is capable of interacting with the data processor; and instructions that cause the data processor to televise the financial services content on a television channel of the television when the financial services content is suitable for television delivery and when the television associated with the user is capable of interacting with the data processor.

8. The non-transitory computer-readable storage medium of claim 7, further comprising instructions that cause the data processor to provide a notification including a predetermined time and a predetermine channel that the financial services content will be televised.

9. The non-transitory computer-readable storage medium of claim 7, further comprising:

instructions that cause the data processor to receive a selection of a predetermined time from the user to televise the financial services content; and instructions that cause the data processor to confirm that the financial services content will be televised at the predetermined time.

10. The non-transitory computer-readable storage medium of claim 7, further comprising:

instructions that cause the data processor to receive user input pertaining to the financial services content; and instructions that cause the data processor to incorporate the user input into the financial services content.

11. The non-transitory computer-readable storage medium of claim 10 wherein the user input is received via telephone.

12. The non-transitory computer-readable storage medium of claim 7, further comprising instructions that cause the data processor to determine that the user does not have Internet access and has a television technology for television interactivity prior to televising the financial services content on the television channel.

13. A system for providing televised financial services, the system comprising:

a memory; and a processor disposed in communication with the memory and configured to issue processing instructions stored in the memory to:

receive a request from a user for financial services content;

generate financial services content personalized with user information;

determine whether the financial services content is suitable for television delivery;

determine whether a television associated with the user is capable of interacting with the processor; and televise the financial services content on a television channel of the television when the financial services content is suitable for television delivery and when the television associated with the user is capable of interacting with the processor.

14. The system of claim 13, the processor further configured to issue instructions to provide a notification including a predetermined time and a predetermined channel that the financial services content will be televised.

15. The system of claim 13, the processor further configured to issue:

instructions to receive a selection of a predetermined time from the user to televise the financial services content; and instructions to provide a notification confirming that the financial services content will be televised at the predetermined time.

16. The system of claim 13, the processor further configured to issue:

instructions to receive user input pertaining to the financial services content; and instructions that incorporate the user input into the financial services content.

17. The system of claim 16 wherein the user input is received via telephone.

* * * * *